(12) United States Patent
Gonsette et al.

(10) Patent No.: US 11,731,785 B2
(45) Date of Patent: Aug. 22, 2023

(54) DEVICE COMPRISING A DRIVE SYSTEM FOR EXTENDING AND RETRACTING A CONDITIONED AIR HOSE

(71) Applicant: LEBRUN—NIMY SA, Nimy (BE)

(72) Inventors: Charles-Etienne Gonsette, Nimy (BE); Claudy Urbain, Nimy (BE)

(73) Assignee: LEBRUN-NIMY SA, Nimy (BE)

( * ) Notice: Subject to any disclaimer, the term of this patent is extended or adjusted under 35 U.S.C. 154(b) by 409 days.

(21) Appl. No.: 16/313,696

(22) PCT Filed: Jun. 26, 2017

(86) PCT No.: PCT/EP2017/065728
§ 371 (c)(1),
(2) Date: Dec. 27, 2018

(87) PCT Pub. No.: WO2018/001971
PCT Pub. Date: Jan. 4, 2018

(65) Prior Publication Data
US 2019/0315489 A1 Oct. 17, 2019

(30) Foreign Application Priority Data
Jun. 30, 2016 (BE) .................................. 2016/5535

(51) Int. Cl.
*B64F 1/36* (2017.01)
*F16H 19/06* (2006.01)
*F16L 3/01* (2006.01)

(52) U.S. Cl.
CPC ............. *B64F 1/362* (2013.01); *F16H 19/06* (2013.01); *F16L 3/01* (2013.01); *F16H 2019/0613* (2013.01)

(58) Field of Classification Search
CPC .. B64F 1/362; F16H 19/06; F16H 2019/0613; F16L 3/01; Y02T 50/80
(Continued)

(56) References Cited

U.S. PATENT DOCUMENTS 4,543,677 A   10/1985 Haglund et al.
6,286,876 B1 *  9/2001 Jasperse .............. F24F 13/0263
                                                 285/260
(Continued)

FOREIGN PATENT DOCUMENTS

EP   2085311 A2   8/2009
WO   2011064808 A1   6/2011

OTHER PUBLICATIONS

International Search Report dated Sep. 4, 2017 for International Application No. PCT/EP2017/065728 filed Jun. 26, 2017.

*Primary Examiner* — Muhammad Ijaz
(74) *Attorney, Agent, or Firm* — MaxGoLaw PLLC

(57) ABSTRACT

A device for storing and extending a hose for supplying conditioned air to an aircraft on the ground or to any other interior space, includes: a tubular housing (11) extending along a longitudinal axis (Z) and having a free open first end, which tubular housing (11) can store a hose; a hose (1) in fluid communication with a conditioned air unit and having a free downstream end; a drive system (4) that can be used to control the extension and retraction of the hose (1) between a retracted position in which the downstream end of the hose (1) is located in the tubular housing (11), and an extended configuration in which the downstream end of the hose (1) is outside the tubular housing (11) and at a distance from the first end of the tubular housing (11). The drive system (4) has N=4 to 8 drive bearings (6.1-6.6) disposed perpendicularly to the longitudinal axis (Z) and connected to one another by N swivel joints (7.1-7.7), thereby forming a closed chain.

15 Claims, 7 Drawing Sheets

(58) Field of Classification Search
USPC .......................................................... 138/106
See application file for complete search history.

(56) References Cited

U.S. PATENT DOCUMENTS

| | | | | |
|---|---|---|---|---|
| 7,946,311 | B2* | 5/2011 | Koizumi | F16L 11/10 |
| | | | | 138/140 |
| 9,365,297 | B2* | 6/2016 | Wright | B60H 1/00264 |
| 9,517,846 | B2* | 12/2016 | Ardura Fernandez | ........................ |
| | | | | B65H 75/362 |
| 10,155,595 | B2* | 12/2018 | Wright | B64F 1/362 |
| 2004/0209565 | A1 | 10/2004 | Bombardi et al. | |
| 2009/0197516 | A1* | 8/2009 | Wright | B60H 1/00264 |
| | | | | 454/119 |
| 2009/0200426 | A1* | 8/2009 | Schroeder | B64D 39/02 |
| | | | | 244/135 A |
| 2016/0214739 | A1* | 7/2016 | Wright | B64F 1/362 |

\* cited by examiner

DEVICE COMPRISING A DRIVE SYSTEM FOR EXTENDING AND RETRACTING A CONDITIONED AIR HOSE

FIELD OF THE INVENTION

The invention relates to an air conditioning system for controlling the temperature of the atmosphere inside an aircraft, such as an airliner, parked on the tarmac of an airport. In particular, the present invention relates to a device for extending and retracting a hose fluidically linking a conditioned air unit to the interior of an aircraft. The device of the present invention comprises a drive system that is reliable, robust, economical and that guarantees a lengthy life of the hose.

TECHNOLOGICAL BACKGROUND

For fuel-saving and pollutant emission reduction reasons, the engines of an aircraft, in particular of an airliner, are cut off when it is parked on the ground on the tarmac of an airport. The conditioned air controlling the temperature and humidity of the air in the cabin is therefore also cut off. The airliners are often equipped with a small turbine making it possible to generate current and rotating independently of the engines, but such turbines are noisy and energy-intensive, and their use has been prohibited in many airports, above all in Europe.

With the high density of passengers present in the cabin on landing, the heat generated by the lights, the many windows and above all the significant insulation of the fuselage mean that the temperature inside the cabin of an airplane rapidly becomes uncomfortable, even unsupportable. For this reason, it is standard practice to couple a hose to the cabin of an airplane, which is linked to a conditioned air unit to blow refrigerated conditioned air into the cabin of the airplane. The conditioned air unit can be a mobile unit, but it is often a fixed unit and the hose is linked to the conditioned air unit by an underground duct or by the telescopic jetway for passengers which makes it possible to link the cabin of the airplane directly to the terminal of an airport (see FIG. 1). The conditioned air unit is then linked to a rigid duct which, in the case of a jetway, is telescopic and fixed generally under said jetway. The duct extends to its distal end which is coupled to a hose making it possible to fluidically connect the conditioned air unit to the interior of the cabin of an airplane parked on the tarmac. A high degree of freedom in the position of connection of the flexible tube to an airplane is essential, because the tube must be able to be connected to different airplane models, to different points of the fuselage, and to different airplane parking positions. For this reason, the flexible tube can have a length of several tens of meters, typically of the order of 20 to 40 m. Obviously, once the conditioning of the air in the cabin of an airplane is finished, it is necessary to appropriately pack away the hose.

A first solution that is fairly widely used consists in winding the hose around a drum as is commonly used for garden hoses. Although this solution is practical and simple to use, it presents the drawback that the hose has to be unwound from its drum over its entire length each time it is used, even if all the length of the hose is not necessary to connect it to an airplane. In fact, the head losses (=pressure losses) in a portion of hose wound around the drum are considerable and do not make it possible to blow conditioned air into the cabin of an airplane with a satisfactory pressure.

There is a second solution which is advantageous compared to the first because it makes it possible to "take out" only the length of hose necessary to connect it to an airplane. As represented in FIG. 1, it consists in using a drive system to retract the hose into a housing (11) extending under the ground or under the jetway, practically as far as the free end of the jetway intended to be coupled to an airplane. The hose can simply be packed in the housing, but this simple solution results in severe head losses if the hose is not extended over its entire length before blowing air into the hose. This drawback can be overcome by reinforcing the hose with a spiral or rings coupled to the outer surface of the hose and conferring upon it a radial rigidity, while making it possible, in the way of the bellows of an accordion, to contract the hose into a contracted configuration and to extend it into an extended configuration by varying the opening pitch between two successive turns of the spiral or the distance between two rings.

Drive systems that make it possible to control the extension and the retraction of a hose have been proposed. For example, EP2085311 describes a dispenser of a hose housed in a tubular housing extending along a longitudinal axis, Z. The dispenser comprises a drive system comprising N drive bearings distributed around a perimeter of the hose and arranged parallel to the longitudinal axis. The N bearings are linked to one another by a chain such that a single motor coupled to one bearing makes it possible to drive the rotation of the N bearings. Each of the N bearings is linked mechanically to a system of belts whose rotation drives the displacement of the hose by friction on the outer surface thereof. Since the rotation of each of the N belts takes place around pinions mounted on an axis of rotation normal to the longitudinal axis and to the N bearings, a system of 90° gears (bevel gears (148) visible in FIG. 4 of EP2085311) is necessary to transmit the rotational movement of the N bearings to the N corresponding belts. This generates significant torque losses, generates noise, and is a potential source of failures.

Another example of drive system is proposed in WO2011064808 proposes a drive system comprising a motor, linked to a pinion rigidly mounted on a first bearing rotating on its axis, said pinion being linked to a return pinion by a strap or a chain provided with protuberances. The rotation of the motorized pinion drives the translation of the protuberances which push on the turns of a spiral reinforcing the hose. In order to uniformly distribute the forces over all the perimeter of the hose, the first bearing is linked by a rotation joint to a second bearing thus transmitting to it the rotation moment. The second bearing is itself linked to a third bearing by a rotation joint, and so on to the Nth or last bearing (for example an $8^{th}$ bearing, with N=8), the N bearings being distributed around the perimeter of the hose. The Nth bearing is not linked to the first bearing by a rotation joint and the N bearings thus form an open chain of N bearings linked to one another by N−1 rotation joints.

The drive system described above is interesting because, on the one hand, it makes it possible to obtain a synchronization of all the bearings, while using only a single motor and, on the other hand, it does not require the use of a mandrel inside the hose acting as bearing surface for a drive system external to the hose, said mandrel provoking severe head losses. However, it does also present a few drawbacks. For example, in order for a sufficient moment to be transmitted to the Nth bearing, the last of the chain, a substantially greater moment has to be transmitted by the motor to the first bearing which transmits a part of the torque to extend or retract the hose and transmits a rotation moment to the second bearing and so on to the Nth bearing, with, on each transmission, only a fraction of the moment received from the preceding bearing being transmitted to the next bearing, up to the last (Nth) bearing which has to receive a sufficient moment for its contribution to the movement of the hose. At least the first bearing must therefore be overdimensioned relative to the moment really necessary to the extension and retraction of a hose. For ease and simplicity of mounting and servicing, all the bearings are usually identical, which implies a general overdimensioning of the drive system as a whole. Another drawback of the system described in WO2011064808 is that all the forces for the extension and retraction of the hose are concentrated on the turns whose interface with the outer surface of the hose is therefore greatly stressed and damages rapidly, requiring the changing of the hose at excessively short intervals. Furthermore, this drive system does not operate on hoses that do not include spirals.

The present invention proposes a solution that makes it possible to overcome the drawbacks of the drive system described in WO2011064808. In particular, the present invention makes it possible to reduce the dimensioning of the drive system. It also makes it possible to prolong the life of a hose, the changing of which is a costly operation.

SUMMARY OF THE INVENTION

The invention is as defined in the main claim and preferred variants are defined in the dependent claims. The present invention comprises in particular a device for packing and extending a hose for supplying conditioned air to an aircraft on the ground or to any other interior space, said device comprising:
(a) a tubular housing extending along a longitudinal axis, Z, and comprising a free and open first end, said tubular housing allowing packing,
(b) a hose comprising a downstream end which is free and an upstream end which is fluidically connected with a conditioned air unit and which is away from the first end of the housing,
(c) A drive system comprising N drive bearings distributed around a perimeter of the hose and situated adjacent to the first end of the housing, the rotation of the N drive bearings making it possible to control, in a first direction of rotation, the extension and, in a second direction of rotation, the contraction of the hose between,
  (i) a contracted configuration in which the downstream end of the hose is situated in the housing and adjacent to the first end of the housing, and
  (ii) an extended configuration in which the downstream end of the hose is out of the housing and away from the first end of the housing.

The drive system of a device according to the present invention comprises N=4 to 8 drive bearings arranged around and each at right angles to the longitudinal axis, Z, a first drive bearing being linked to a motor capable of controlling its rotation about its axis, said first drive bearing being linked in series to the N−1 other drive bearings by rotation joints allowing the transmission of a rotation from the first drive bearing to the N−1 other drive bearings, the Nth drive bearing being itself linked by a rotation joint to the first drive bearing, thus forming a closed chain of N drive bearings linked to one another by N rotation joints.

If the rotation joints are non-homokinetic joints such as universal joints, preferably double universal joints, then the number, N, of drive bearings must be even and is preferably, N=4, 6 or 8 drive bearings. In the case of homokinetic joints, the number, N, of drive bearings can be even or odd. For example, the device can comprise N=4, 5, 6, 7 or 8 drive bearings. For reference, the device comprises N=4 to 6 drive bearings, and even preferably comprises N=4 or 6 drive bearings linked to one another by universal joints, preferably double universal joints. Examples of homokinetic joints that can be cited include Rzeppa joints, tripod joints or Tracta joints, all well known to the person skilled in the art.

In a preferred variant of the present invention, each of the N drive bearings comprises a toothed drive pinion coupled to a return surface, for example a free pinion, by a chain comprising paddles (14) having a flexible free end mounted in such a way that the free ends of a number of paddles are permanently in contact with an outer surface of the hose. The translation of the paddles in contact with the hose in one direction or in the other depending on the direction of rotation of the corresponding drive bearing applies a friction to the outer surface of the hose which thus makes it possible to control the extension or the retraction thereof. The flexible free surface of the paddles can have the geometry of a square, U-shaped, triangular, trapezoid or comb-shaped profile comprising several blades. The flexible free surface of the paddles forms a contact surface with the outer surface of the hose, said contact surface preferably having a mean width measured in the direction of the longitudinal axis of at least 10 mm, preferably at least 15 mm, even more preferably at least 20 mm, in order to offer a significant contact surface with the outer surface of the hose.

In an alternative variant of the present invention, each of the N drive pinions is coupled to a return bearing by a belt provided with outer protuberances whose translation in one direction or in the other depending on the direction of rotation of the corresponding drive bearing applies a friction to an outer surface of the hose which thus makes it possible to control the extension or the retraction thereof.

In the preceding two variants, the hose can be reinforced by a spiral coupled to the outer surface of the hose and conferring upon it a radial rigidity, while making it possible to contract the hose into its contracted configuration and to extend it into its extended configuration by varying the opening pitch between two successive turns of the spiral. The drive system then preferably comprises at least two, preferably at least three or more flexible paddles or outer protuberances lying between two turns of the spiral in the extended configuration of the hose.

In another variant of the present invention, each of the N drive bearings is provided with a drive pinion rigidly mounted on each drive bearing, and comprising a substantially cylindrical peripheral surface in contact with an outer surface of the hose and whose rotation in one direction or in the other applies a friction to said outer surface of the hose which thus makes it possible to control the extension or the retraction thereof.

The device according to the present invention can also comprise a rigid tube, at least partially clad by a portion of the hose including its upstream end. This rigid tube extends along alongitudinal axis from a first end fluidically connected with a conditioned air source, to a second end which is free, over a length equal to at least 80%, preferably at least 90%, even more preferably at least 95% of the total length of the hose in its contracted configuration from its upstream end. The upstream end of the hose can advantageously be fixed to a coupling ring which encircles the rigid tube to form a seal-tight coupling between the rigid tube and the hose, said coupling ring being mounted on the rigid tube so as to be able to slide along the rigid tube. The sliding of the coupling ring makes it possible to increase the action radius of the hose by a distance corresponding to the length over which the coupling ring can slide, without overdimensioning any element of the device. For example, the coupling ring can be translated along the rigid tube over at least 40%, preferably at least 70% of the length of the rigid tube. In particular, the coupling ring can for example slide over a distance of at least 3 m, preferably at least 4 m, even more preferably at least 5 m.

The device according to the present invention can also comprise a fixed ring, which is fixed adjacent to the second end of the rigid tube and which forms a bearing surface situated inside the hose for the drive system which is situated outside the hose. Such a ring is of particular interest for hoses that are not reinforced by a spiral or rings, but is advantageous with or without such a reinforcement, because it makes it possible to clamp the wall of the hose between the drive system situated on the outside of the wall of the hose and the fixed ring situated on the inside of said wall.

BRIEF DESCRIPTION OF THE FIGURES

These and other aspects of the invention will be clarified in the detailed description of particular embodiments of the invention, reference being made to the drawings in the figures, in which.

DETAILED DESCRIPTION OF PARTICULAR EMBODIMENTS

Figure 1A:
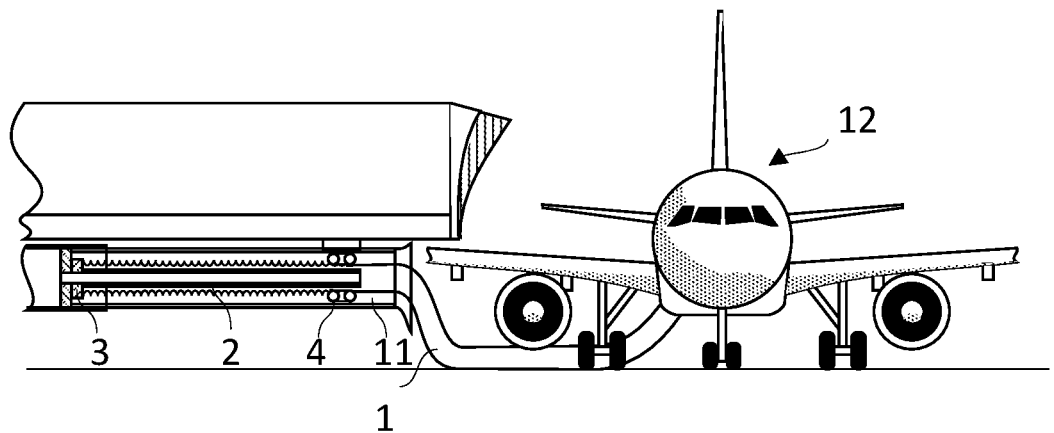
FIG. 1 is an overview of a hose linking a conditioned air unit (not illustrated) to an airplane via a duct (a) fixed to a telescopic jetway for passengers and (b) extending in an underground duct.
Figure 1B:
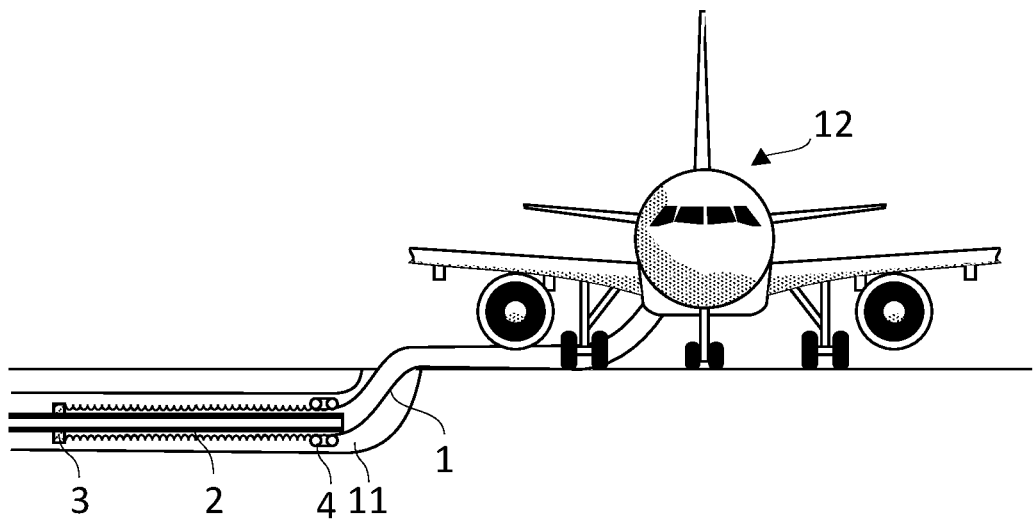

As represented in FIGS. 1 and 6(*c*), the device for extending and retracting a hose according to the present invention comprises a tubular housing (11) extending along a longitudinal axis, Z, and comprising a free and open first end. Said tubular housing makes it possible to pack away a hose. The minimum length of the tubular housing must therefore be sufficient to contain a substantial fraction of the length of the hose in its contracted configuration.

A hose (1) according to the present invention comprises a downstream end which is free and an upstream end which is fluidically connected with a conditioned air unit. The upstream end is away from the first end of the tubular housing and is generally coupled to a rigid tube, either fixedly, or in such a way as to be able to slide along the rigid tube, as explained in more detail below. The downstream end of the hose is generally provided with an element for coupling to a fuselage input of an airplane.

As illustrated in FIG. 6(*a*)&(b), a device according to the present invention comprises a drive system (4) comprising N drive bearings (6.1-6.6) distributed around a perimeter of the hose and each being arranged at right angles to the longitudinal axis, Z. The N bearings can enter into rotation about their respective axis of rotation. The number N of bearings lies between 4 and 8, and is preferably selected from among N=4, 5, 6 or 7, or even more preferably from among N=4 or 6 as represented in FIGS. 6(*a*)&(b). A first drive bearing is linked to a motor (8) capable of controlling the rotation of the first drive bearing about its axis. The first drive bearing is linked in series to the N−1 other drive bearings by rotation joints (7.1-7.6) allowing the transmission of the rotation of the first drive bearing to the N−1 other drive bearings. The Nth (and last) drive bearing being itself linked by a rotation joint to the first drive bearing, thus forming a closed chain of N drive bearings linked to one another by N rotation joints. The closed chain of N drive bearings is fixed to the walls of the tubular housing by supports which are coupled to certain drive bearings via mechanical rolling bearings, for example ball bearings (not illustrated in the figures).

The rotation of the N drive bearings makes it possible to control, in a first direction of rotation, the extension, and, in a second direction of rotation, the contraction of the hose between, (i) a contracted configuration (10) in which the downstream end of the hose is adjacent to the second end of the rigid tube (see (a) of FIGS. 2 to 5), and (ii) an extended configuration (1E) in which the downstream end of the hose is away from the second end of the rigid tube and can be coupled to an airplane parked within the action radius of the hose (see (b) of FIGS. 2 to 5) illustrating a partially extended configuration), The essence of the invention lies in the use of a closed chain of N bearings linked to one another by N rotation joints, contrary to the drive system described in WO2011064808. A first advantage of a closed chain compared to an open chain of N drive bearings is that, in a closed chain, the moment transmitted by the motor to the first drive bearing (6.1) is transmitted simultaneously to the second and Nth drive bearings (6.2, 6.N) which are situated on either side of the first drive bearing. The second and Nth drive bearings (6.2, 6.N) transmit the rotation moment to the third and (N−1)th drive bearings, and so on, as far as the last drive bearing. In the case where N is even (preferred case), the last drive bearing to which a rotation moment is transmitted, and therefore the one which receives the smallest rotation moment, is the (1+N/2)th drive bearing. By contrast, in the case of an open chain, the last bearing to receive a rotation moment is the Nth. As for N=4 to 8, N>(1+N/2), the Nth drive bearing of an open chain necessarily receives a smaller rotation moment lower than that which the (1+N/2)th drive bearing of a closed chain receives. An open chain of N drive bearings must therefore be overdimensioned compared to a closed chain of N drive bearings for an equal or smaller rotation moment value transmitted to a drive bearing of the chain. The use of a closed chain therefore makes it possible to reduce the size of the drive system (4) and to reduce the costs of its components, despite the fact that it requires an additional rotation joint.

Figures 6A, 6B:
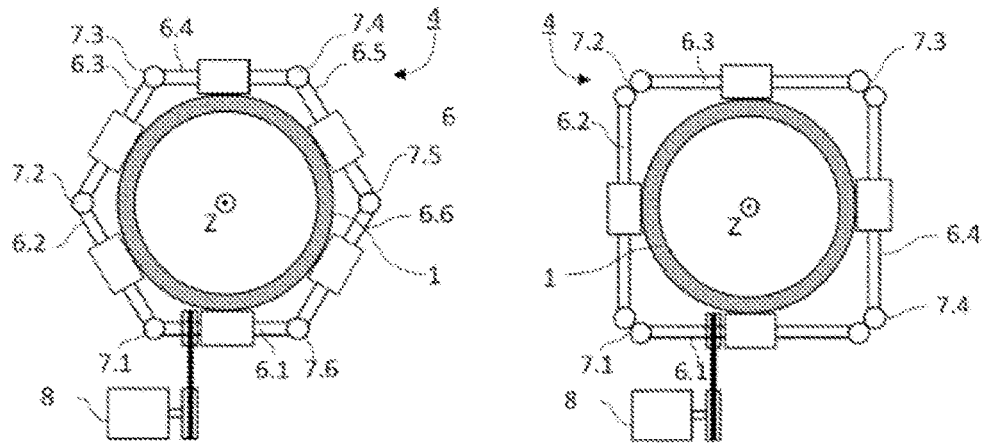
FIG. 6 represents drive systems of the hose (a) seen from the front in a first variant with N=6, (b) seen from the front in a second variant with N=4, and (c) seen in profile in a preferred variant with N=6.

In the same spirit of reducing the size and the cost of the drive system, it is preferable to use fewer than 8 drive bearings. In particular, as illustrated in FIGS. 6(a)&(b) it is preferable to use N=4 or N=6 drive bearings. This makes it possible to considerably reduce the bulk of the drive system which has to be fixed under a jetway or in an underground passage, as illustrated in FIG. 1.

The rotation joints can be homokinetic or not. If non-homokinetic joints are used, such as universal joints, the number N of bearings must be even in order not to provoke blocking of the rotation of the chain on itself. In this case, it is preferable for the number, N, of bearings to be equal to 4, 6 or 8, preferably N=4 or 6. If universal joints are used, above all for low values of N, it is preferable to use double universal joints, making it possible to reduce by half the angle of each element of a double universal joint compared to the angle between the successive axes of first and second bearings (see FIG. 6(b) in which double universal joints are represented schematically as double-circles).

The homokinetic joints make it possible to use odd numbers, N, of bearings. Preferably, N lies between 4 and 7. A number N less than 4 requires angles between bearings that are greater and difficult to manage. A number N greater than 7 or 8 increases the price and the bulk of the system without any particular advantage. Homokinetic rotation joints include, for example, Rzeppa joints, tripod joints or Tracta joints, all well known to the person skilled in the art.

Figure 6C:
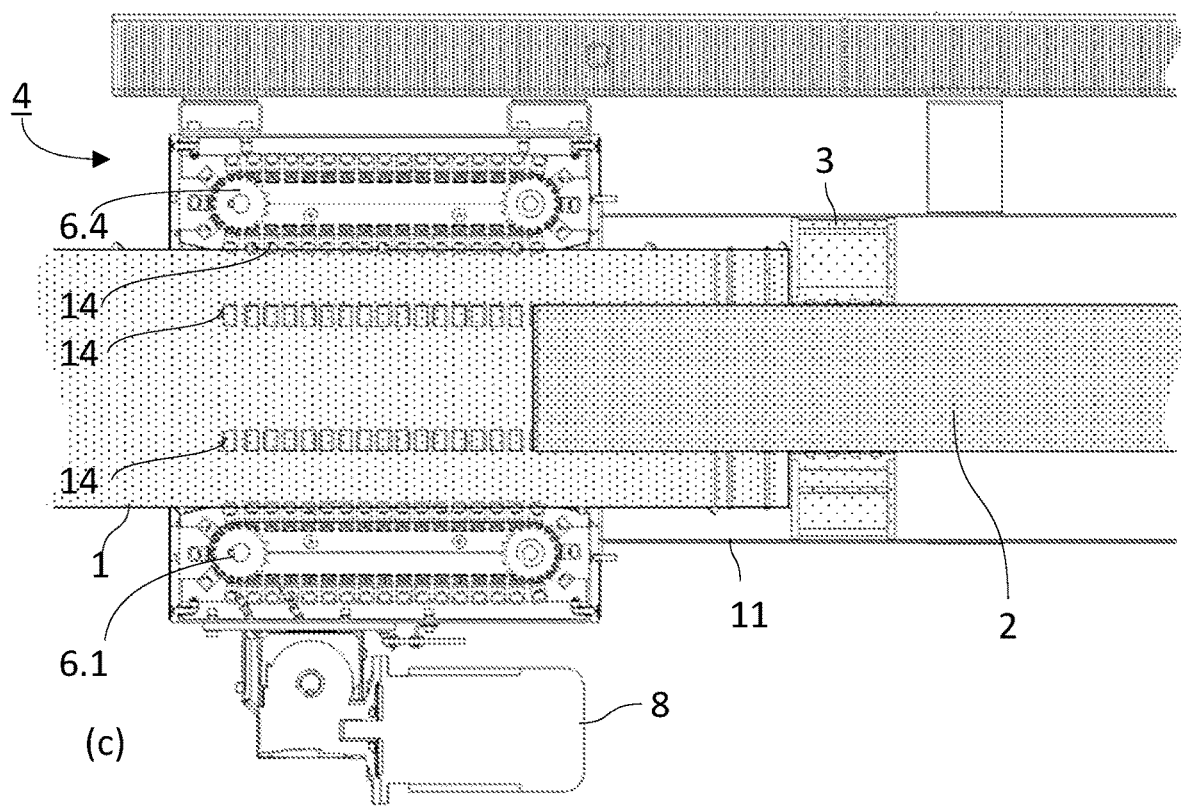
Figure 7A:
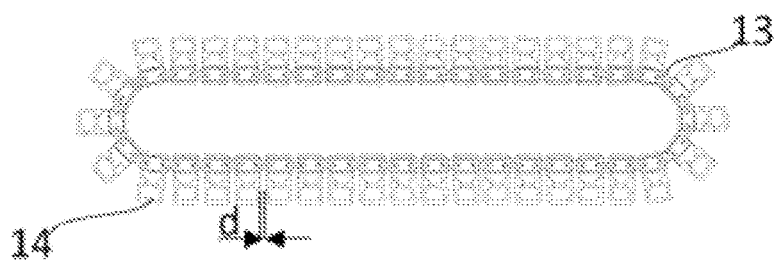
FIG. 7 illustrates different densities of paddles mounted on chains of a drive system suitable for the present invention.
Figure 7B:
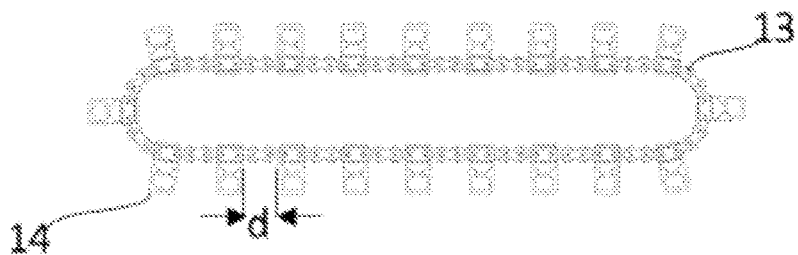
Figure 7C:
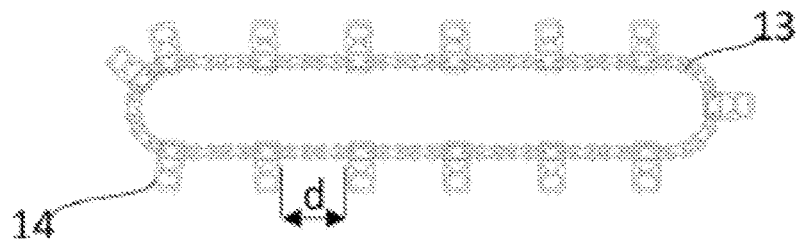
Figure 7D:
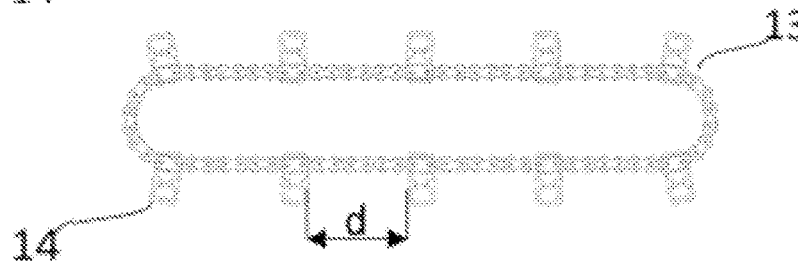

In a preferred embodiment of the present invention illustrated in FIG. 6(c), each of the N drive bearings (6.1-6.6) of the drive system comprise a toothed drive pinion mounted rigidly on each drive bearing and coupled to a return surface by a chain (13). The return surface can be a free pinion, toothed or not, or simply a curved surface allowing the slippage of the chain and the return thereof to the toothed drive pinion. The chain comprises paddles (14) having a flexible free end (14f) mounted in such a way that the free ends of at least two paddles are permanently in contact with an outer surface of the hose. The rotation of the chain drives the translation in one direction or in the other depending on the direction of rotation of the paddles located in the portion of chain adjacent to the hose lying between the toothed drive pinion and the return surface. The translation of the paddles rubbing against the outer surface of the hose drives the extension or the retraction thereof.

As illustrated in FIG. 8, each paddle has a fixing portion (14s) comprising means for fixing to the chain, and a free end (14f) which is flexible and which enters into contact temporarily with the surface of the hose upon the rotation of the chain around the drive pinion. The portion of fixing to the chain is obvious to any person skilled in the art, and the mechanism of the fixing means used does not influence the present invention, as long as the fixing is sufficiently strong to withstand the stresses of use of the device. In general, it will comprise two orifices corresponding to the orifices of the links of the chain provided to receive the rivets to link the chain links together while allowing them a degree of freedom in rotation.

Figures 8A, 8B, 8C, 8D:
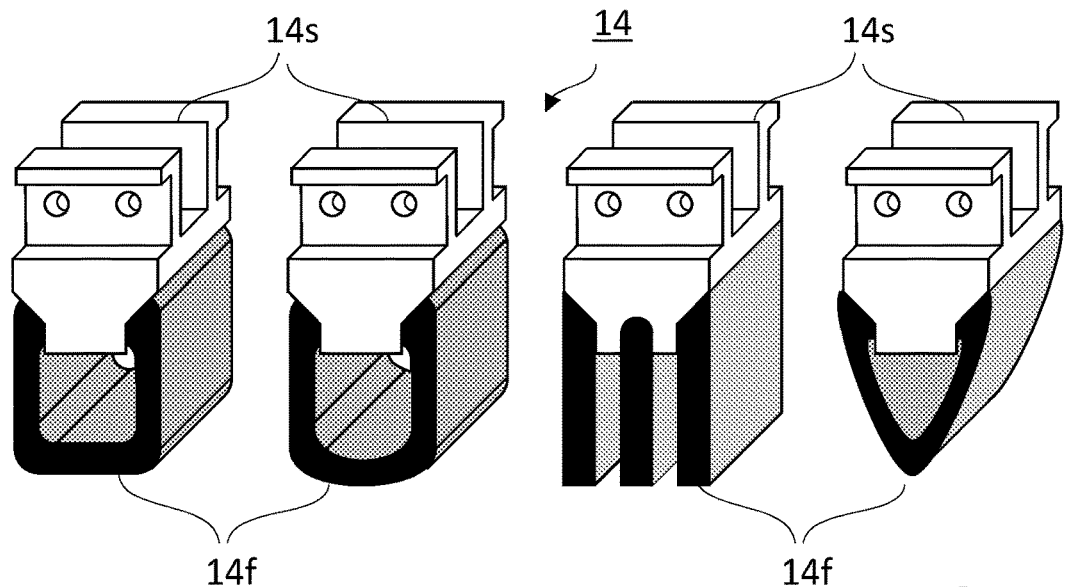
FIG. 8 shows different types of profiles of the flexible free end of a paddle suitable for the present invention.

The free end (14f) of the paddles must be sufficiently flexible to follow the topography of, and not to damage the surface of, the hose, and must be sufficiently rigid to provoke the translation of the hose by friction. The free end is preferably produced in an elastomer material, such as natural or synthetic rubber, thermoplastic elastomer, for example polyurethane, olefin, etc. The form of the free end is limited only by the need to offer a contact surface with the outer surface of the hose that is sufficiently large, adhesive and non-aggressive to allow the transfer of kinetic energy from the paddles to the hose without damaging its outer surface. FIG. 8 shows a few examples of paddles having flexible free ends (14f) of different geometries. In FIG. 8(a), the free end has a rectangular profile, offering a large contact surface with the outer surface of the hose. FIG. 8(b) shows a U-shaped profile which makes it possible to create more friction with the outer surface of the hose. FIG. 8(c) shows a comb profile with several flexible blades. The blades are represented in FIG. 8(c) as being straight and parallel to one another, but they can be curved, for example forming a fantail. The number of blades is not limited. FIG. 8(d) shows a triangular profile, which allows for a better penetration between two turns of a reinforcing spiral, when a hose reinforced with a spiral is presented under a paddle in its contracted configuration, with the turns of the spiral being practically in contact with one another. Other profiles are possible such as a trapezoidal profile with the small base or, alternatively, the large base, in contact with the outer surface of the hose. FIG. 8 shows hollow profiles. Depending on the flexibility desired, the material used and the dimensions of the free end, solid profiles can also be used.

In order to allow the extension or the retraction of the hose by friction of the paddles without damaging the outer surface of the hose, it is preferable for the flexible free surface of the paddles to form a significant contact surface with the outer surface of the hose. For example, for profiles of the type illustrated in FIG. 8(a) or (b), said contact surface can have a mean width measured in the direction of the longitudinal axis, Z, of at least 10 mm, preferably at least 15 mm, even more preferably at least 20 mm. The length of the surface in the direction normal to the width can be at least 20 mm, preferably at least 30 mm, even more preferably at least 35 mm. The center distance between the toothed drive pinion and the return surface preferably lies between 200 and 600 mm. In the case of a hose reinforced with a reinforcing spiral, the center distance is preferably at least equal to the pitch separating two turns of the spiral of the hose in its extended configuration. Preferably, the center distance is at least equal to two pitches separating three turns of the spiral of the hose in its extended configuration.

The paddles are mounted on the chain preferably at intervals, d, of 1 to 60 mm, preferably 2 to 10 mm of distance separating one paddle from the other (see FIG. 7). In practice, the density of paddles mounted on the chain is controlled according to the fraction of links on which paddles are mounted (for example, one paddle every n links). FIG. 7 illustrates different examples. In FIG. 7(a), each link (or pair of links) comprises a paddle. FIGS. 7(b) to (d) show other examples of chains comprising a lower density of paddles, with one paddle every two links, every three links, and every four links, respectively. The optimal density of links depends on a balance between production cost, ideal driving of a hose and, if there is one, on the pitch between turns of a reinforcing spiral. It is preferable for at least 5, preferably at least 8, even more preferably at least 10, even more preferably at least 12 and even at least 15 paddles and more to be permanently in contact with the outer surface of the hose in order to optimize the transfer of movement to the hose.

In an alternative variant, each of the one or several drive pinions are coupled to a return surface by a belt, toothed or not on one or two faces, and provided with protuberances at least on the outside (=face of the belt in contact with the hose). As for the preceding variant, the translation of the protuberances provoked by the rotation of the belt in one direction or in the other depending on the direction of rotation of the corresponding drive bearing applies a friction on an outer surface of the hose which thus makes it possible to control the extension or the retraction thereof. The protuberances of the belt can be flexible or rigid, but they are preferably flexible in order to treat the outer surface of the hose carefully.

In devices of smaller dimensions, the N bearings (6.1-6.6) of the drive system comprise a pinion or drive wheel rigidly mounted on each drive bearing. Each pinion or drive wheel has a sufficient thickness and enters into contact directly with the outer surface of the hose. Like the wheels of a car, the friction of the drive pinions on the outer surface of the hose transforms the rotation of the drive pinions into translation of the hose. The drive pinion can moreover be provided with a tire which attenuates the wear of the outer surface of the hose in contact therewith.

As mentioned above, in many air conditioning devices—but not in all—the hose is reinforced by rings or by a spiral coupled to the outer surface of the hose and conferring upon it a radial rigidity, while making it possible to contract the hose into its contracted configuration and to extend it into its extended configuration by varying the pitch between rings or the opening pitch between two successive turns of the spiral. Such a spiral offers many advantages, by permanently ensuring a certain opening of the orifice of the hose over its length and by limiting the twisting of the hose which makes it possible to avoid, for example, areas of pinching of the hose where the air can no longer circulate.

In the case of hoses reinforced by rings or by a spiral, the drive system then preferably comprises at least two, preferably at least three, even more preferably at least five or even eight or more flexible paddles or outer protuberances lying between two rings or turns of the spiral adjacent in the extended configuration of the hose. In practice, the paddles push the hose by friction with the outer surface thereof. Furthermore, the one, two, even three paddles in contact with turns or rings protruding from the hose contribute to the movement of the hose by pushing on the turns or rings.

Figure 2A:
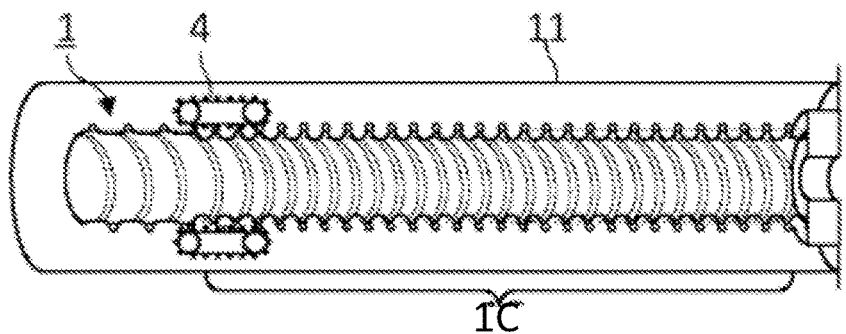
FIG. 2 represents a device for extending and retracting a hose with the hose (a) in its contracted configuration and (b) in a partially extended configuration.
Figure 2B:
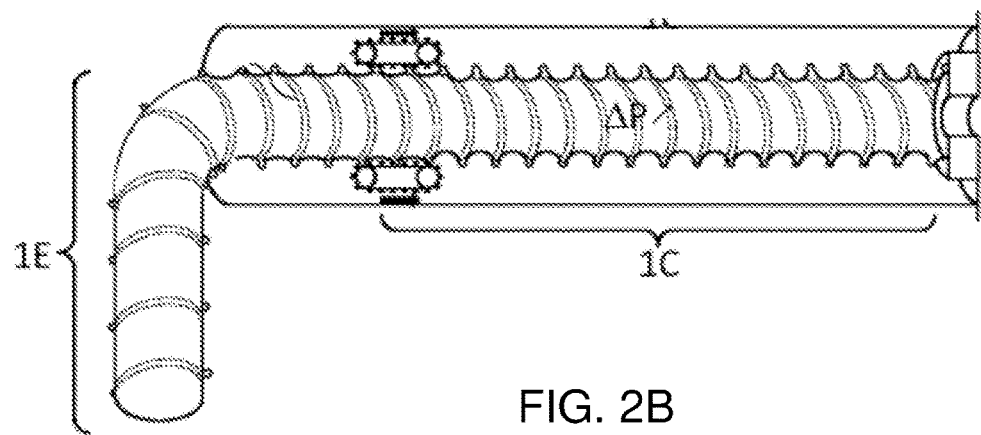

FIG. 2 shows a first example of device according to the present invention. The hose (1) is reinforced with a spiral and is coupled at its upstream end to a conditioned air intake linked to a conditioned air unit (not illustrated in the figure). The drive device (4) is as described above with reference to FIG. 6. FIG. 2(*a*) shows a hose in its contracted configuration (10), and is entirely contained in the tubular housing (11) with the turns of the spiral compressed against one another. By activating the rotation of the bearings, the paddles or protuberances rub on the outer surface of the hose, and push on the turns of the spiral and thus extend the hose which exits from the tubular housing into its extended configuration (1E) (see FIG. 2(*b*)). The device of FIG. 2 works, but has the drawback of generating significant head losses, ΔP, in a conditioned air current circulating in the portion of hose still packed away in the tubular housing (11) in its contracted configuration (10). In fact, the contraction of the turns forms significant convolutions in the inner wall of the hose in its contracted configuration, which generate turbulences and pressure losses (in its extended configuration (1E), the inner surface of the hose is relatively smooth). It follows therefrom that it is recommended to extend the hose over all its length to avoid head losses, that are, granted, less significant than in the case of a hose wound around a drum, but are nevertheless consequential.

Figure 3A:
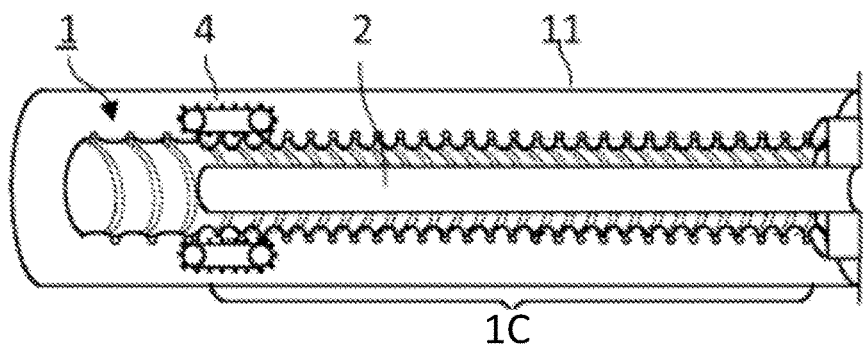
FIG. 3 represents another device for extending and retracting a hose with the hose (a) in its contracted configuration and (b) in a partially extended configuration.
Figure 3B:
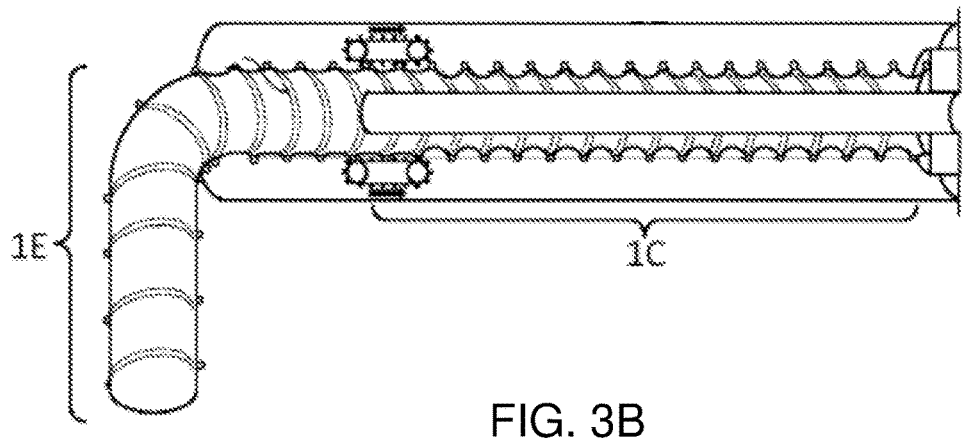

To overcome the drawback of the head losses described above, the variant of FIG. 3, which like FIG. 2 illustrates a device with the hose in its (a) contracted (10) and (b) partially extended (1E) configuration, comprises, in addition, a rigid tube (2) extending along the longitudinal axis, Z, from a first end fluidically connected with a conditioned air source, to a second end which is free. At least a portion of the rigid tube extending from its second end is contained or enveloped in the hose which, in its contracted configuration, is packed away on the rigid tube over at least 80%, preferably at least 90%, even more preferably at least 95% of the total length of the hose in its contracted configuration from its upstream end, only its downstream end extending beyond the rigid tube (see FIG. 3(*a*)). The drive system (4) is positioned adjacent to the second end of the rigid tube in order to be able to "push" the hose on the rigid tube during the operation of contraction and packing away of the hose. As represented in FIG. 3(*b*), when the hose is extended over only a part of its length, the rigid tube is contained in the portion (10) of hose remaining in its contracted configuration and the conditioned air flowing in the rigid tube does not "see" the convolutions of the inner wall of the hose in its contracted configuration and penetrates into the hose only in its portion (1E) which is extended, with much smoother inner walls. Consequently, the head losses are considerably reduced compared to the variant of FIG. 2.

The length of the rigid tube depends on the length needed to pack away the hose in its retracted configuration. The degree of contraction of a spiral-wound hose as described above, defined as the ratio LC/LE, between the length, LC, of the hose in its contracted configuration and its length, LE, in its extended configuration, is typically of the order of 1/10 to 1/6. For a hose of length, LE, of 30 m, that means that the length of the rigid tube necessary to pack away the hose in its retracted configuration can be of the order of 3 to 5 m. In practice and depending greatly on the size of the device, a rigid tube has a length of at least 2 m, preferably at least 3 m, even more preferably at least 5 m. In order to contain the bulk and the costs of installation of the device, it is preferable for the rigid tube to have a length less than 10 m, preferably less than 8 m and even more preferably less than 6 m.

Figure 5A:
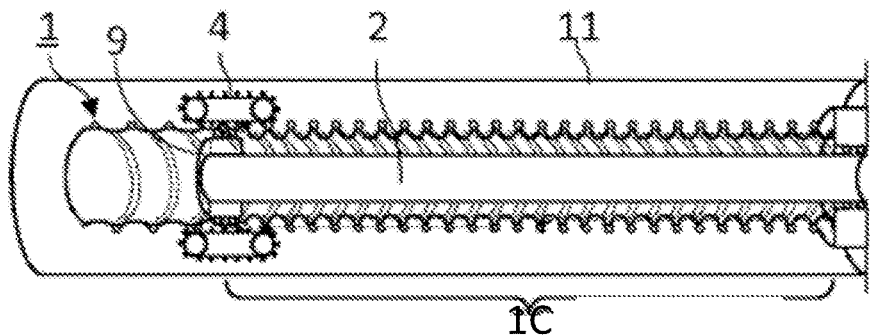
FIG. 5 represents another variant of a device for extending and retracting a hose with the hose (a) in its contracted configuration and (b) in a partially extended configuration.

In a variant illustrated in FIG. 5, particularly advantageous in the case of hoses which are not reinforced by rings or by a spiral, but also preferred in the case of such a reinforcement, a fixed ring (9) is fixed adjacent to the second end of the rigid tube. Such a fixed ring, which can be translated along the rigid tube, makes it possible to form a bearing surface situated inside the hose for the drive systenot which is situated outside the hose, without creating turbulences as a mandrel would. A bearing surface can be useful to improve the efficiency of the transfer of energy from the drive system into movement of the hose because the wall of the hose is pinched between the paddles, protuberances or pinion and the bearing surface formed by the fixed ring (9). For greater efficiency, the fixed ring can be provided with rolling bearings at the point where it forms contact surfaces with the different elements of the drive system. Such a device considerably reduces the wear of the outer surface of the hose.

Figure 4A:
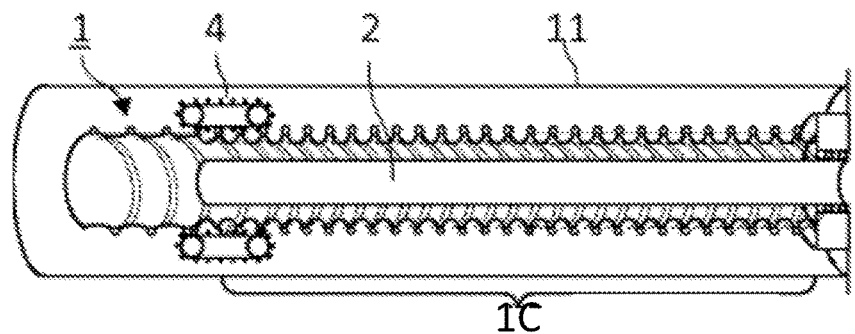
FIG. 4 represents a variant of a device for extending and retracting a hose with the hose (a) in its contracted configuration and (b) in a partially extended configuration.
Figure 4B:
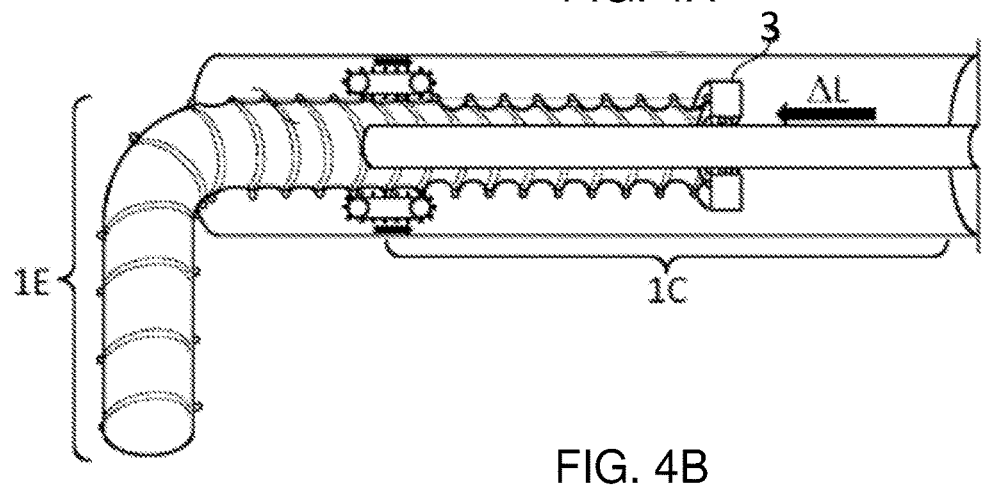
Figure 5B:
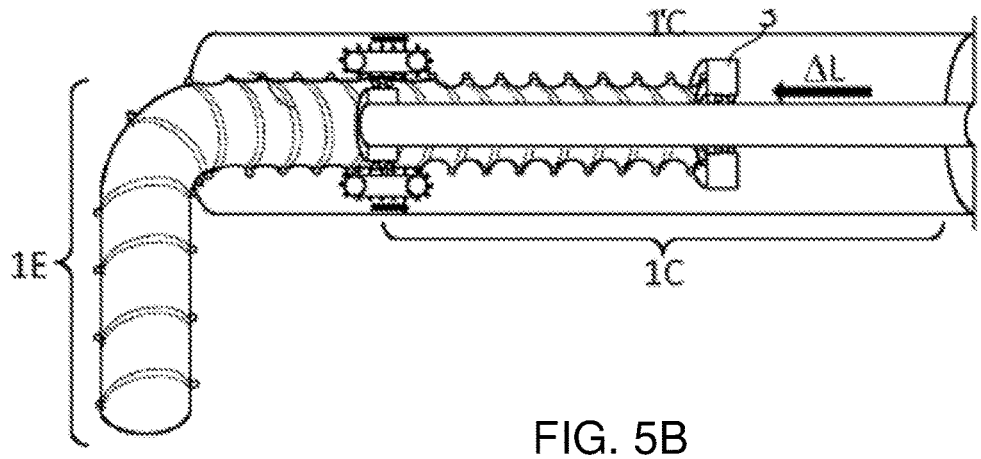
Figure 10A:
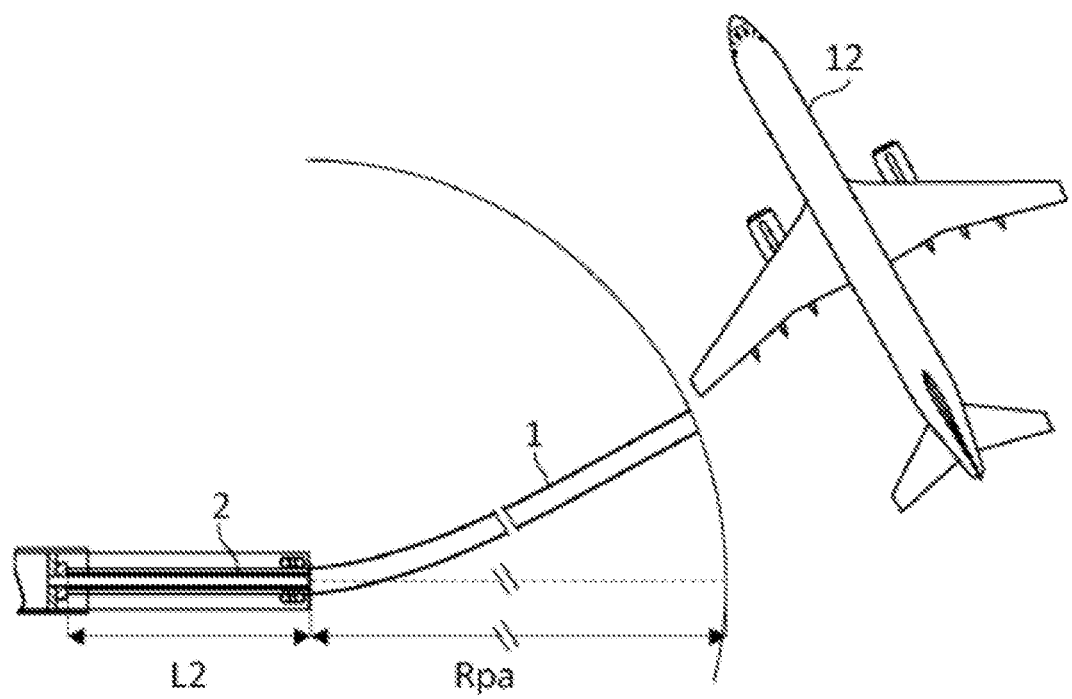
FIG. 10 compares the action radius of a hose of given length between (a) a device of the prior art and (b) a device according to a preferred variant of the present invention.
Figure 10B:
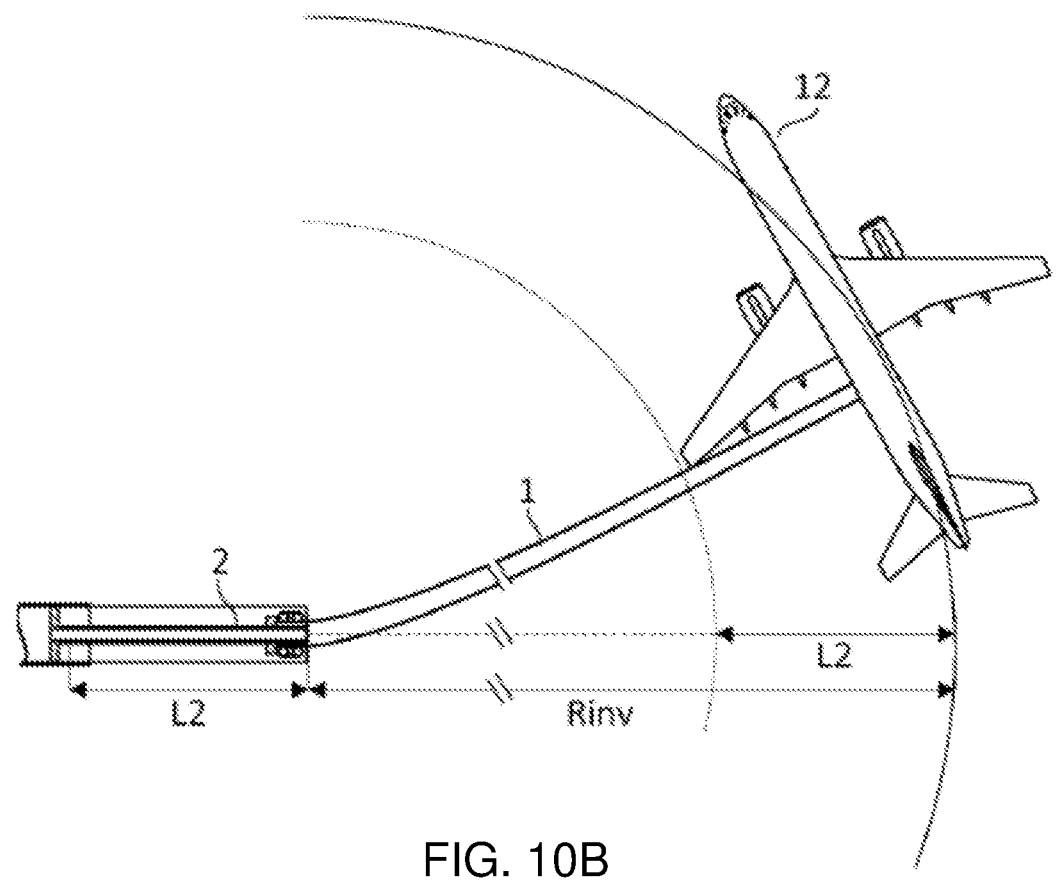

As airports and airlines demand increasingly greater flexibility in the parking of the airplanes and therefore in the supply of services such as the supply of conditioned air, the length of the hoses must increase and, consequently, so much the length of the rigid tubes, which has a considerable impact on the bulk of the devices, and above all on the cost of installation or of adaptation of existing systems. To address these needs, without increasing the dimensions either of the hose or of the rigid tube, in a variant illustrated in FIGS. 4 and 5, the hose (1) is fixed by its upstream end to a coupling ring (3), which encircles the rigid tube forming a seal-tight coupling between the rigid tube and the hose. The coupling ring (3) is mounted on the rigid tube in such a way as to be able to slide along the rigid tube. In this way, as illustrated in FIGS. 4(b), 5(b) and 10, the action radius, Rpa, of a hose of given length is increased by the length, L2, of the rigid tube along which the coupling ring can be displaced, i.e. by several meters, making it possible to reach airplanes situated at a radius, Rinv, =Rpa+L2.

The coupling ring comprises a central opening preferably provided:
  (a) with balls or rollers distributed over a perimeter of said central opening and resting on an outer surface of the rigid tube, allowing the translation of said coupling ring along the rigid tube, and
  (b) with a dynamic seal making it possible to ensure the seal-tightness between the central opening and the rigid tube even during the translation of the coupling ring along the rigid tube.

Rollers make it possible to ensure a translation of the coupling ring without rotation thereof about the longitudinal axis, Z, of the rigid tube. If such a rotation had to be avoided, the surface of the rigid tube can be provided with guides, such as grooves, extending parallel to the longitudinal axis, Z, in which the rollers would be guided. In practice, excluding particular constraints and taking care to avoid any excessive twisting of the hose, it has been observed that it can be preferable to allow the coupling ring to enter into rotation about the longitudinal axis, Z, of the rigid tube. In fact, without rotation, it is always the same portion of hose which enters into contact with and rubs against the ground of the tarmac. A faster wear is therefore observed on these portions than on the opposite portions of the hose which never enter into contact with the ground. By allowing the rotation of the coupling ring, the hose is allowed to touch the ground over all of its perimeter and thus the wear of the hose can be distributed over a greater surface. The service life of a hose can thus be prolonged.

The coupling ring does not need to be motorized. In fact, during the extension of the hose, the portion (1C) still contracted is extended by the drive system, thus applying a stress on the coupling ring drawing it toward the second end of the rigid tube. Conversely, during retraction of the hose, the drive system pushes the hose over the rigid tube, thus applying a stress on the coupling ring pushing it from the second end toward the first end. However, if necessary, the coupling ring can be motorized, for example by linking it mechanically to the drive system which is provided with a motor (8).

The dynamic seals are well known to the person skilled in the art and the specific type of seals used is not essential to the present invention, provided that it makes it possible to ensure a seal-tightness also, preferably, during the movement of the ring along the rigid tube. Examples that can be cited include,
  O-ring seals, the contact pressure of which on mounting produces the seal-surface seal-tightness;
  four-lobe seals, representing a seal of "square" section comprising two active lips on each part; the elasticity of the latter ensures the seal-tightness at rest;
  L or T lip seals, of which the lip, by virtue of its elasticity, is in contact with the surface;
  seals with liners and spring, which comprise a spring facilitating the seal-surface contact and which improve the efficiency of the seal over time;
  wiper seals;
  segments, as used in pistons.

The coupling seal must be able to be translated along the rigid tube over the greatest possible distance in order to proportionally increase the action radius of the hose. Preferably, the coupling ring must be able to be translated over at least 40%, preferably at least 70%, even more preferably at least 90%, and even at least 95% of the length of the rigid tube. In practice, if the coupling ring can be translated over a distance of at least 3 m, preferably at least 4 m, even more preferably at least 5 m, the action radius of the hose is increased by as much.

The hose is coupled to the coupling ring by means well known to the person skilled in the art. For example, the upstream end of the hose can be glued, welded, pinched between two plates, etc., or by combinations of these techniques. The way in which the upstream end of the hose is coupled to the coupling ring is not essential to the present invention, provided that the coupling is seal-tight and sufficiently resistant to the stresses which are applied to it during the use of the device.

In most cases, the hoses are delivered with the drive system and their nominal diameter (that is to say in the deployed state and under internal pressure) is matched to the diameter of the closed chain of N drive bearings. It may however be that the drive system has to be adapted to hoses of different diameters, for example in case of emergency replacement of a damaged hose. It is therefore advantageous to be able to vary the diameter of the closed chain, to adapt to hoses of different nominal diameters. FIG. 9(b)&(c) illustrates a preferred variant of a drive system according to the invention in which the diameter of the closed chain can be adapted to hoses of different nominal diameters.

Figure 9A:
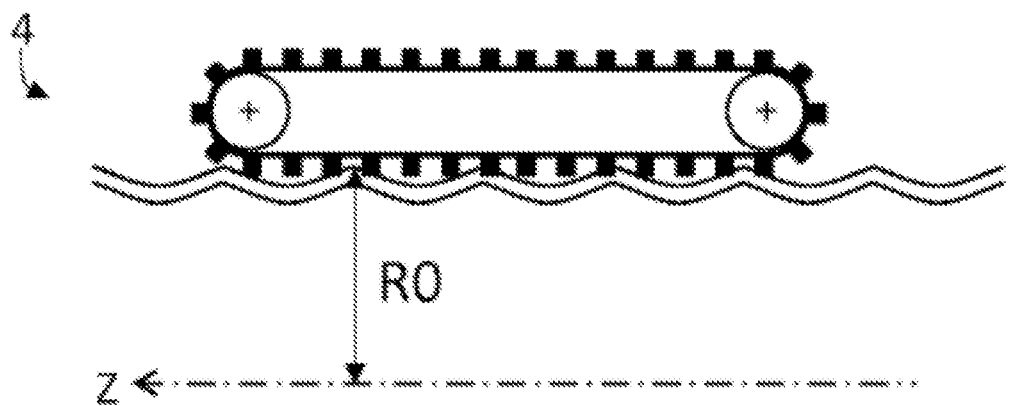
FIG. 9 illustrates a preferred variant of drive systems that adapt to hoses of different nominal radii.
Figure 9B:
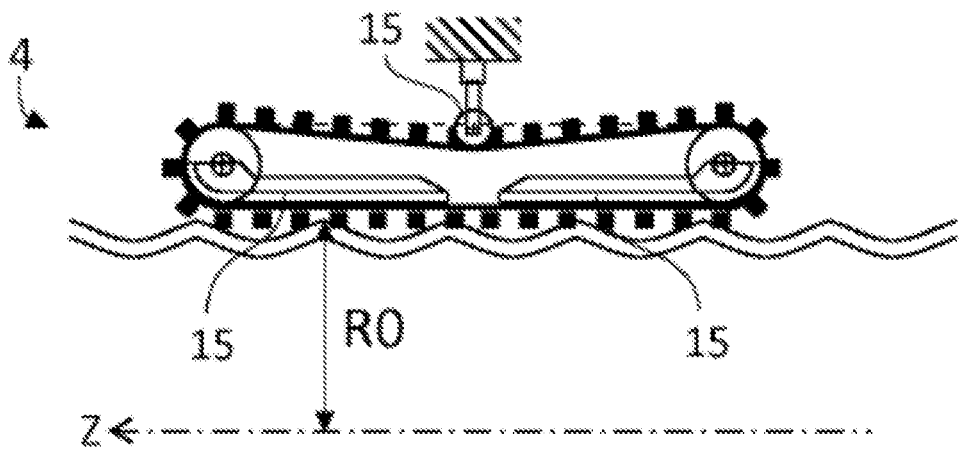

FIG. 9(a) illustrates a drive system suitable for operating with a hose only of radius R0. A small variation of R0, of the order of ±10%, should not pose any problem. However, if a hose of radius, R1<R0, substantially less than R1, had to be mounted on the drive system of FIG. 9(a), it is possible that the drive of the hose is not optimal, because the friction forces applied by the paddles (14) on the outer surface of the hose would decrease commensurately.

Figure 9C:
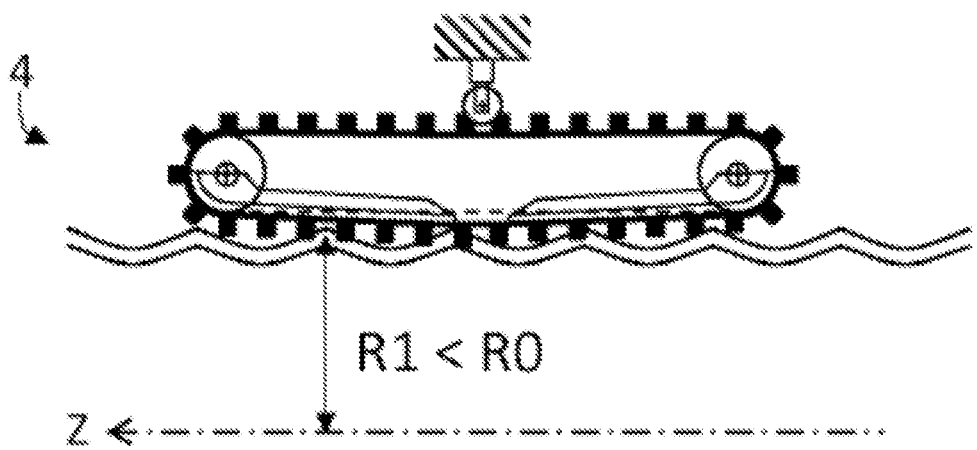

FIG. 9(b) shows a preferred variant, intended as the variant of FIG. 9(a) to drive a hose of nominal radius, R0, but which is also suitable for driving a hose of nominal radius, R1<R0, substantially less than R1, as illustrated in FIG. 9(c). In the preferred variant of FIG. 9(b)&(c), a drive chain (13) is mounted, that is longer than the drive chain of the variant of FIG. 9(a). A first portion of the drive chain (13) whose paddles (14) are in contact with the outer surface of the hose is kept under tension by one or more resilient tensors (15) kept pre-stressed so as to tension the first portion of chain. Similarly, a second portion of drive chain opposite the first portion is also kept under tension by one or more resilient tensors (15) kept prestressed so as to tension the second portion of chain. Thus, like a bicycle gear, the drive chain remains taut whatever the nominal radius of the hose and the paddles remain in contact with the outer surface of the hose. The tensors (15) can be mounted on pivoting and resilient supports, as illustrated in FIG. 9(b)&(c) for the tensors of the first portion, or linearly with a spring or a pneumatic system, as illustrated for the second portion of the chain. The important thing is that a force having a radial component should be applied to the first portion of chain in

| REF | CHARACTERISTIC |
|---|---|
| 1 | Hose |
| 1C | Contracted configuration of the hose |
| 1E | Extended configuration of the hose |
| 2 | Rigid tube |
| 3 | Coupling ring |
| 4 | Drive system |
| 6.1-6.6 | Bearings |
| 7.1-7.6 | Rotation joints |
| 8 | Motor |
| 9 | Fixed ring |
| 11 | Tubular housing |
| 12 | Airplane |
| 13 | Drive chain |
| 14 | Paddle |
| 14f | Flexible free end of the paddle |
| 14s | Fixing end of the paddle |
| 15 | Tensors of the drive chain |
| Z | Longitudinal axis |

The invention claimed is:

1. A device for packing and extending a hose for supplying conditioned air to an aircraft (12) on a ground or to any other interior space, said device comprising:
   (a) a tubular housing (11) extending along a longitudinal axis (Z), and comprising a free and open first end, said tubular housing allowing packing,
   (b) a hose (1) comprising a downstream end which is free and an upstream end which can be connected in fluid communication with a conditioned air unit and which is away from the first end of the housing,
   (c) a drive system (4) comprising a first drive bearing and N −1 other drive bearings including second, third. .... and Nth drive bearings and summing all together a total number of N drive bearings distributed around a perimeter of the hose and situated adjacent to the first end of the housing, the rotation of the N drive bearings making it possible to control, in a first direction of rotation, the extension along the longitudinal axis (Z) and, in a second direction of rotation, the contraction of the hose along the longitudinal axis (Z) between,
      (i) a contracted configuration (1C) in which the downstream end of the hose is situated in the housing and adjacent to the first end of the housing, and
      (ii) an extended configuration (1E) in which the downstream end of the hose is out of the housing and away from the first end of the housing,
   characterized in that, the drive system comprises N=4 to 8 drive bearings (6.1-6.6) and defining four drive bearings, five drive bearings, six drive bearings, seven drive bearings, or eight drive bearings, respectively, the N=4 to 8 drive bearings being arranged around the longitudinal axis (Z) and each drive bearing having a bearing drive axis parallel to one another and at a right angle to the longitudinal axis (Z),
   the first drive bearing (6.1) of the drive system being linked to a motor (8) capable of transmitting rotary power for rotation about the bearing drive axis of the first bearing drive (6.1),
   the first drive bearing (6.1) being linked in series to the second drive bearing, which is linked in series to a third drive bearing, and so on until an (N−1)$^{th}$ drive bearing is linked in series to the N$^{th}$ drive bearing by rotation joints (7.1-7.6) allowing the transmission of a rotation from the first drive bearing to the second, third. ... (N−1)$^{th}$, and N$^{th}$ drive bearings of the drive system,
   the N$^{th}$ drive bearing of the drive system being itself linked by a rotation joint to the first drive bearing, thus forming a closed chain of the N drive bearings linked to one another by N rotation joints, the closed chain surrounding the longitudinal axis (Z), wherein the N rotation joints are universal joints or homokinetic joints.

2. The device as claimed in claim 1, wherein the drive system has the four, the six, or the eight drive bearings and wherein the rotation joints are universal joints.

3. The device as claimed in claim 2, wherein the universal joints are double-universal joints.

4. The device as claimed in claim 1, wherein the rotation joints are the homokinetic joints and are selected from among Rzeppa joints, tripod joints, or Tracta joints.

5. The device as claimed in claim 1, in which each of the N drive bearings of the drive system comprises a toothed drive pinion coupled to a return surface by a chain (13) comprising paddles (14) having a flexible free end (14f) mounted in such a way that the free ends of a number of paddles are permanently in contact with an outer surface of the hose, and whose translation in one direction or in the other depending on the direction of rotation of the respective drive bearing applies a friction to the outer surface of the hose which thus makes it possible to control the extension or the retraction thereof.

6. The device as claimed in claim 5, in which the flexible free surface (14f) of the paddles has the geometry of a square, U-shaped, triangular, trapezoidal or comb-shaped profile comprising several blades.

7. The device as claimed in claim 6, in which the flexible free surface of the paddles forms a contact surface with the outer surface of the hose, said contact surface having a mean width measured in the direction of the longitudinal axis of at least 10 mm.

8. The device as claimed in claim 1, in which each of the N drive bearings of the drive system is coupled to a return bearing by a belt provided with outer protuberances whose translation in one direction or in the other depending on the direction of rotation of the respective drive bearing applies a friction to an outer surface of the hose which thus makes it possible to control the extension or the retraction thereof.

9. The device as claimed in claim 5, in which the hose is reinforced by a spiral coupled to the outer surface of the hose and conferring upon it a radial rigidity, while making it possible to contract the hose into its contracted configuration and to extend it into its extended configuration by varying the opening pitch between two successive turns of the spiral, and in which the drive system comprises two or more paddles or outer protuberances lying between two turns of the spiral in the extended configuration of the hose.

10. The device as claimed in claim 1, in which each of the N drive bearings of the drive system is provided with a drive pinion rigidly mounted on each drive bearing, and comprising a substantially cylindrical peripheral surface in contact with an outer surface of the hose and whose rotation in one direction or in the other applies a friction to said outer surface of the hose which thus makes it possible to control the extension or the retraction thereof.

11. The device as claimed in claim 1, further comprising a rigid tube (2) at least partially clad by a portion of the hose including its upstream end, said rigid tube extending along a longitudinal axis from a first end connected in fluid communication with a conditioned air source, to a second end which is free, over a length equal to at least 80% of the total length of the hose in its contracted configuration from its upstream end.

12. The device as claimed in claim 11, comprising a fixed ring (9), which is fixed adjacent to the second end of the rigid tube and which forms a bearing surface situated inside the hose for the drive system which is situated outside the hose.

13. The device as claimed in claim 11, in which the upstream end of the hose is fixed to a coupling ring (3) which encircles the rigid tube to form a seal-tight coupling between the rigid tube and the hose, said coupling ring being mounted on the rigid tube so as to be able to slide.

14. The device as claimed in in claim 11, in which the length is equal to at least 90% of the total length of the hose in its contracted configuration from its upstream end.

15. The device as claimed in in claim 11, in which the length is equal to at least 95% of the total length of the hose in its contracted configuration from its upstream end.

\* \* \* \* \*